(12) United States Patent
Walker

(10) Patent No.: US 12,104,731 B2
(45) Date of Patent: Oct. 1, 2024

(54) PUSH FIT PIPE FITTING REMOVAL TOOL

(71) Applicant: Tim Walker, Merkel, TX (US)

(72) Inventor: Tim Walker, Merkel, TX (US)

(*) Notice: Subject to any disclaimer, the term of this patent is extended or adjusted under 35 U.S.C. 154(b) by 11 days.

(21) Appl. No.: 18/095,592

(22) Filed: Jan. 11, 2023

(65) Prior Publication Data

US 2024/0229996 A1    Jul. 11, 2024

(51) Int. Cl.
*F16L 37/091* (2006.01)
*B25B 27/28* (2006.01)

(52) U.S. Cl.
CPC .......... *F16L 37/0915* (2016.05); *B25B 27/28* (2013.01)

(58) Field of Classification Search
CPC .............. F16L 37/0927; F16L 37/0915; F16L 37/0982; B25B 7/02; B25B 7/10; B25B 7/12; B25B 7/123; B25B 5/14; B25B 27/00; B25B 27/02
See application file for complete search history.

(56) References Cited

U.S. PATENT DOCUMENTS

| | | | |
|---|---|---|---|
| 4,889,022 A | 12/1989 | Peviani | |
| 5,007,312 A | 4/1991 | Bailey | |
| 7,861,622 B2 | 1/2011 | Chervenak | |
| 9,566,691 B2 | 2/2017 | Ford | |
| 2015/0360350 A1 | 12/2015 | Jiang | |
| 2019/0202040 A1* | 7/2019 | Park | B25B 27/10 |

FOREIGN PATENT DOCUMENTS

CN        214723870        11/2021

* cited by examiner

Primary Examiner — Aaron M Dunwoody

(57) ABSTRACT

A pipe disassembly system for removing a pipe fitting from a pipe includes a fitting removal tool comprising a locking pliers with engagement members attached to the jaws of the locking pliers for engaging the pipe fitting. One of the engagement members engages a body of the pipe fitting, and another of the engagement members engages a release collar of the pipe fitting to move the release collar to disengage from the pipe.

14 Claims, 8 Drawing Sheets

PUSH FIT PIPE FITTING REMOVAL TOOL

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to pipe fitting removal tools and more particularly pertains to a new pipe fitting removal tool for removing a pipe fitting from a pipe.

(2) Description of Related Art Including Information Disclosed Under 37 CFR 1.97 and 1.98

The prior art relates to pipe fitting removal tools and includes tongs for engaging a push fit style pipe fitting for removal of the pipe fitting from a pipe. The prior art also relates to locking pliers of myriad variations. However, the prior art does not disclose a pipe fitting removal tool that incorporates locking pliers and a pair of engagement members for engaging the pipe fitting to disengage from the pipe.

BRIEF SUMMARY OF THE INVENTION

An embodiment of the disclosure meets the needs presented above by generally comprising a pipe fitting comprising a body and a retainer. The body has a channel extending into the body and an opening extending into the body to the channel. The retainer is coupled to the body and is positioned in the channel. The retainer comprises a retaining ring and a release collar. The retaining ring is coupled to an inner wall of the body and is positioned within the channel. The retaining ring includes a plurality of teeth which is arranged radially with respect to the channel. Each tooth of the retaining ring is biased toward a retaining position wherein each tooth extends radially inwardly with respect to the channel. Each tooth of the retaining ring is configured for engaging a pipe inserted into the channel through the opening and the retaining ring when each tooth is positioned in the retaining position.

The release collar is slidably coupled to the body and extends through the opening. The release collar has an outward end which is positioned outside of the channel and has an inward end which is positioned within the channel. The inward end is positioned in abutment with each tooth of the retaining ring. The release collar is movable axially inwardly of the channel to move each tooth of the retaining ring radially outwardly with respect to the channel to a release position. In the release position, each tooth is disengaged from the pipe inserted into the channel through the opening and the retaining ring.

A fitting removal tool is provided for removing the pipe fitting from the pipe. The fitting removal tool comprises a locking pliers, a first engagement member, and a second engagement member. The locking pliers has a first jaw and a second jaw. The second jaw is pivotally movable toward and away from the first jaw. As such, the second jaw is movable from an open position toward the first jaw to a locking position, and the second jaw is securable in the locking position. The first engagement member is coupled to and extends away from the first jaw. The second engagement member is coupled to and extends away from the second jaw. The fitting removal tool is positionable such that the first engagement member engages the body of the pipe fitting and the second engagement member engages the release collar of the retainer to position the teeth of the retaining ring in the release position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
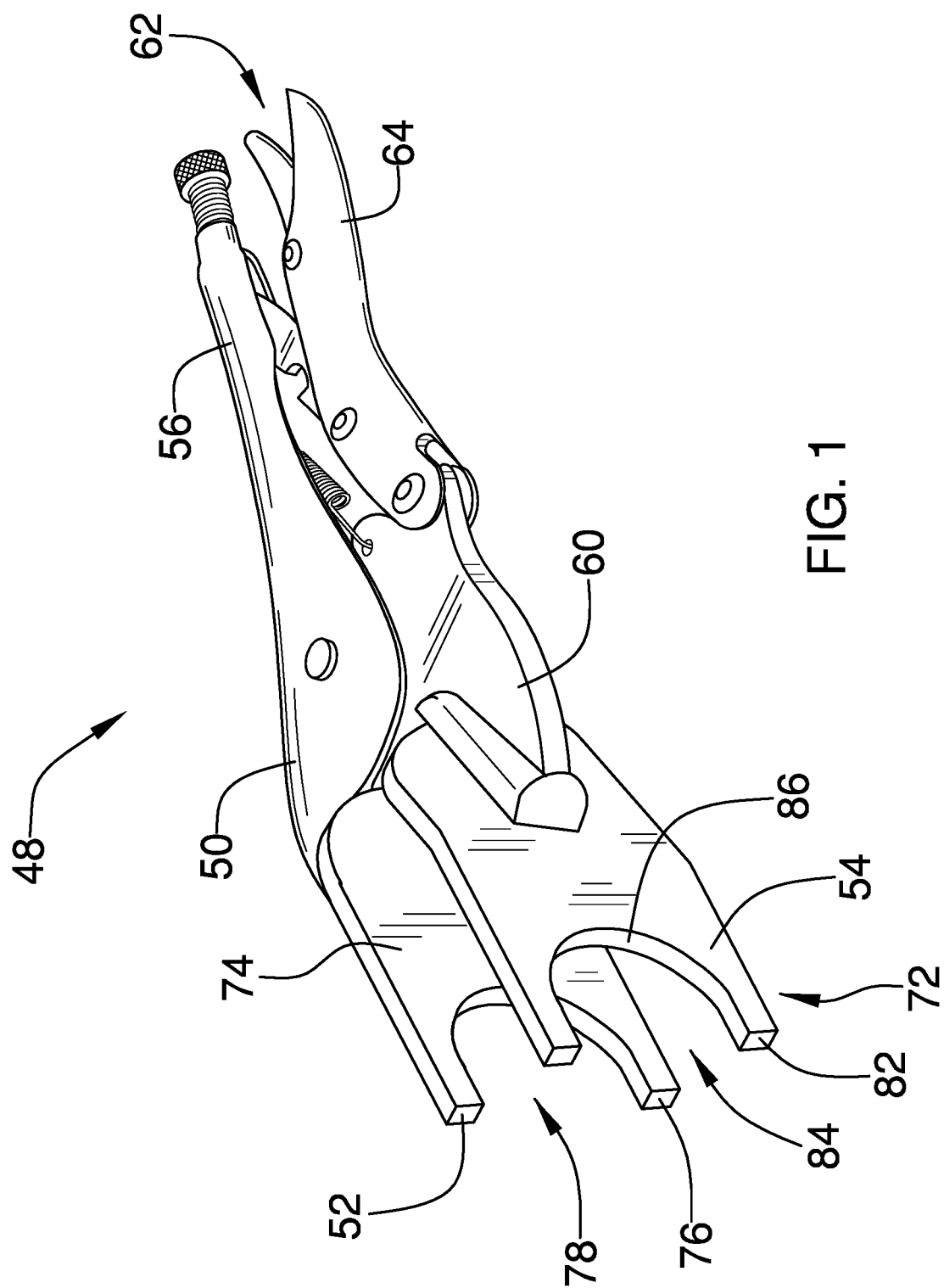
FIG. 1 is a top front side perspective view of a pipe removal tool of a pipe disassembly system according to an embodiment of the disclosure.
Figure 2:
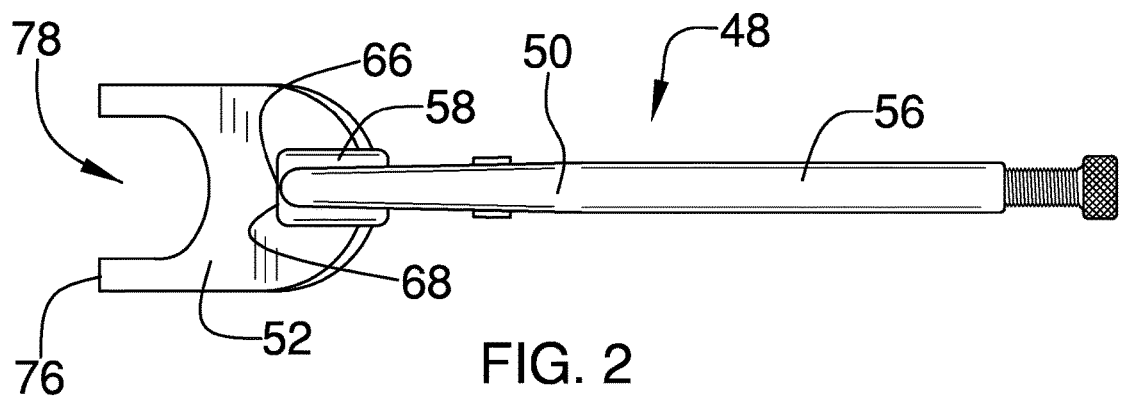
FIG. 2 is a top view of a pipe removal tool according to an embodiment of the disclosure.
Figure 3:
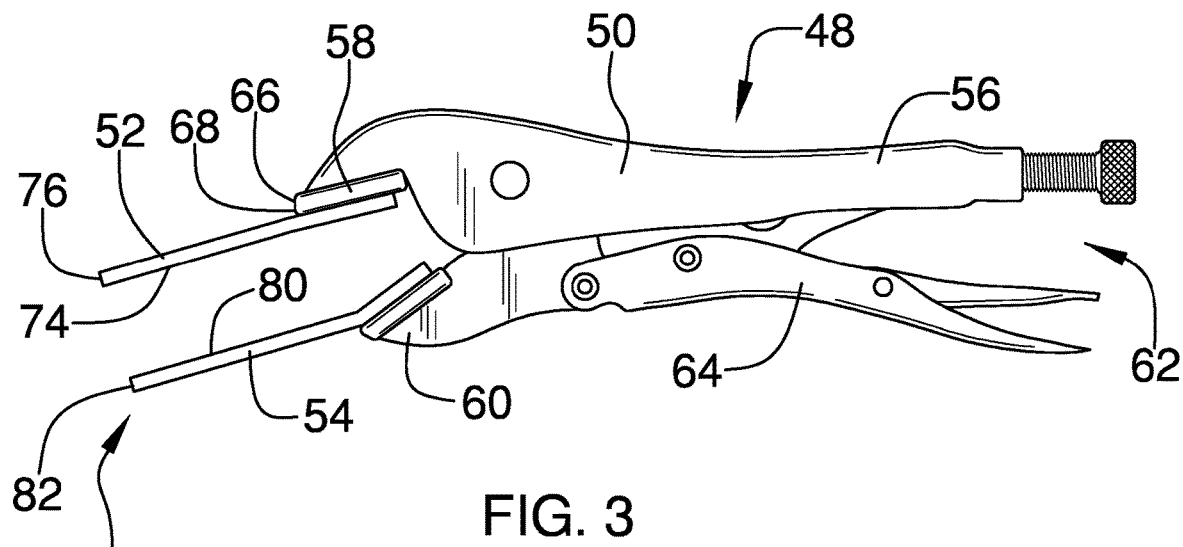
FIG. 3 is a side view of a pipe removal tool according to an embodiment of the disclosure.
Figure 4:
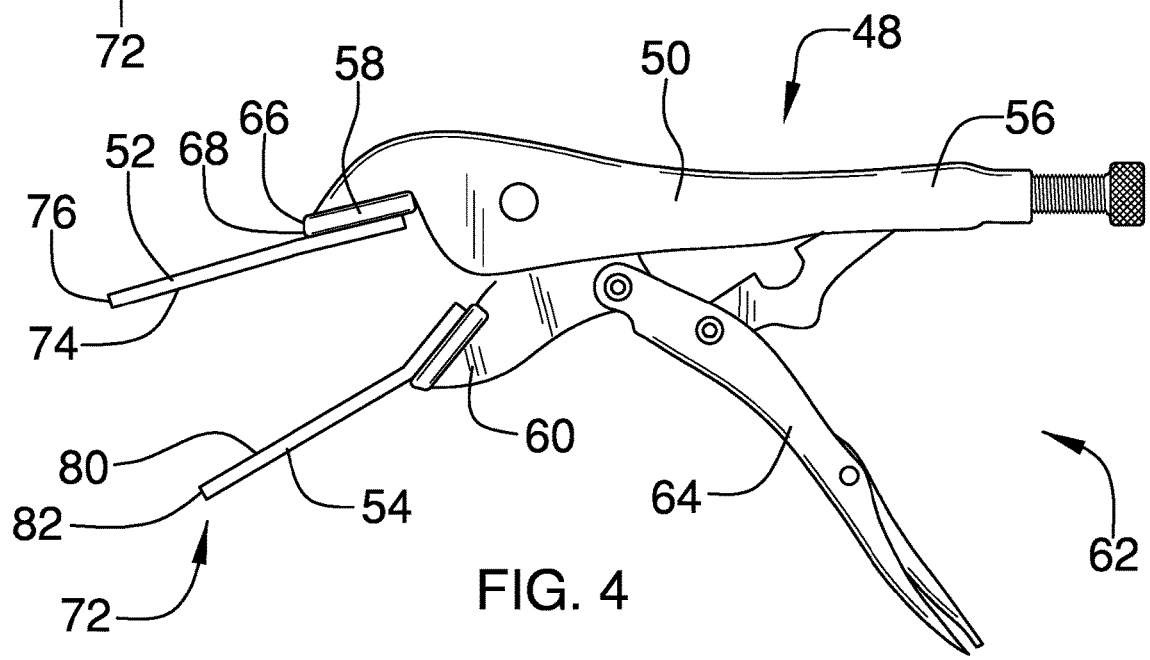
FIG. 4 is a side view of a pipe removal tool according to an embodiment of the disclosure.
Figure 5:
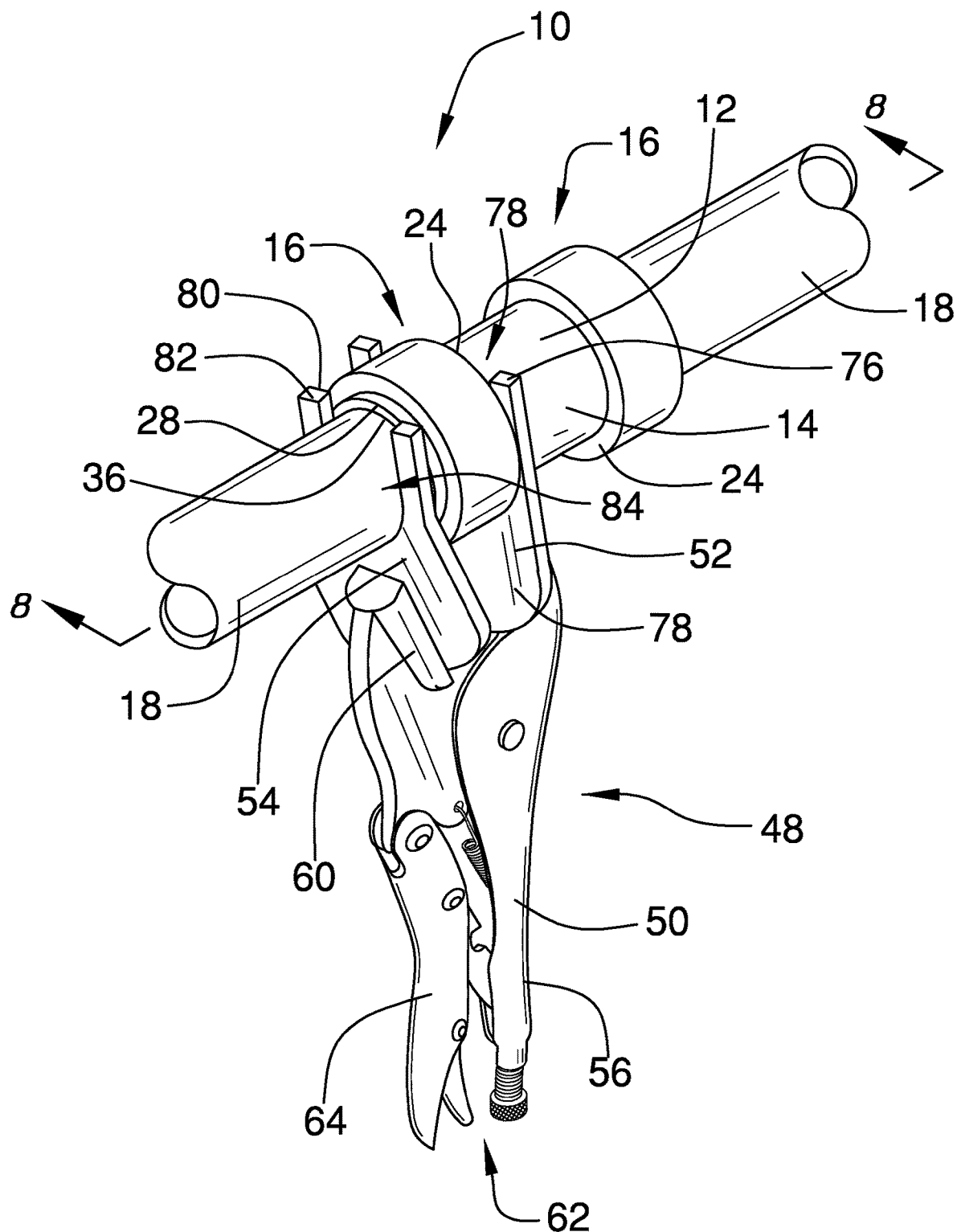
FIG. 5 is an in-use view of an embodiment of the disclosure.
Figure 6:
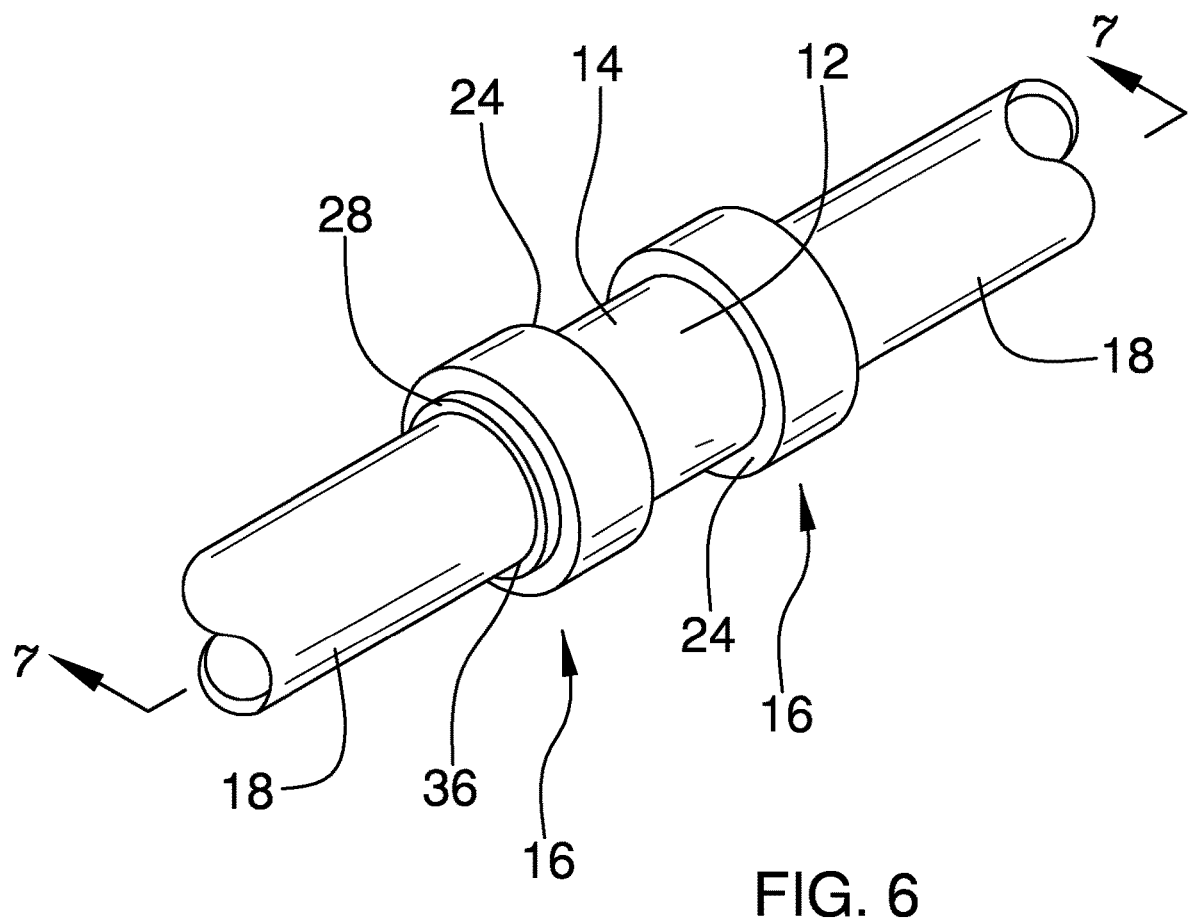
FIG. 6 is a perspective view of a pipe fitting according to an embodiment of the disclosure.
Figure 7A:
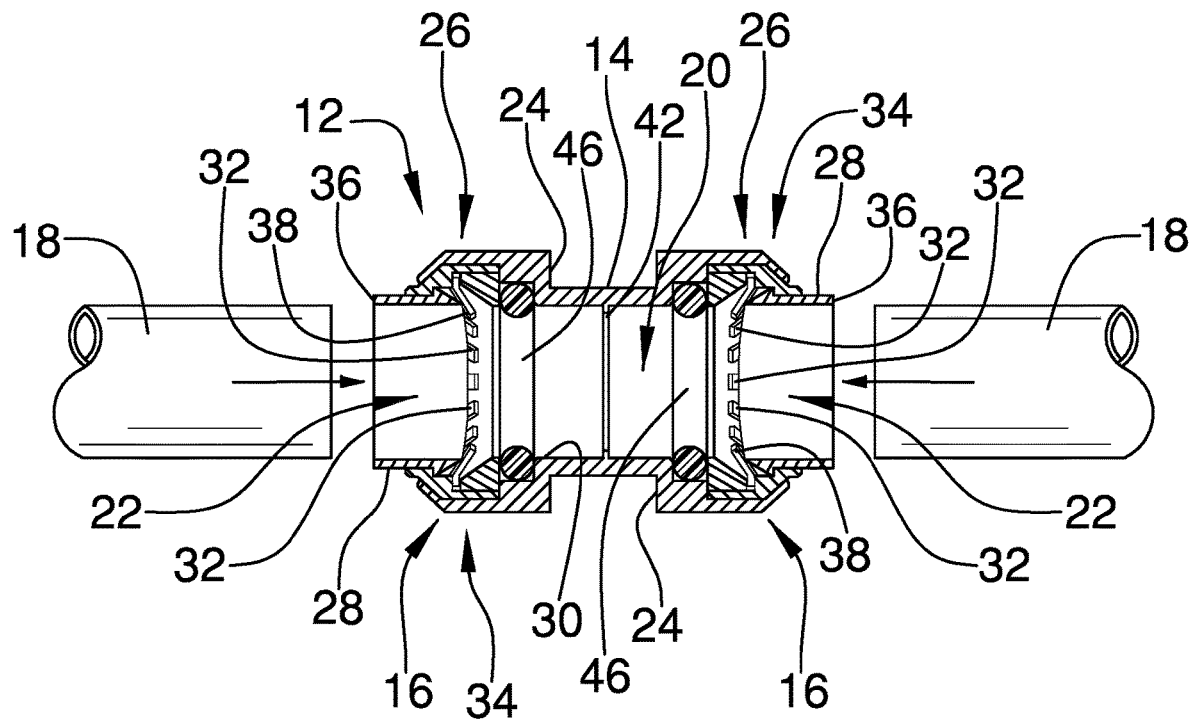
FIG. 7A is a cross-section view of a pipe fitting according to an embodiment of the disclosure taken from Arrows 7-7 in FIG. 6.
Figure 7B:
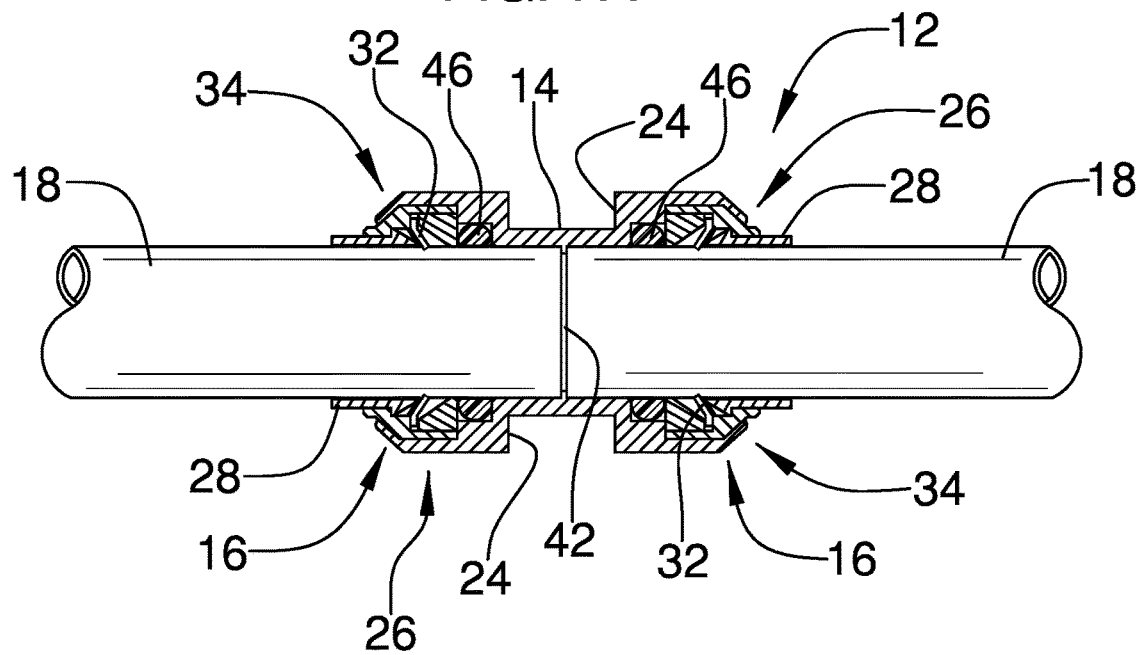
FIG. 7B is a cross-section view of a pipe fitting according to an embodiment of the disclosure taken from Arrows 7-7 in FIG. 6.
Figure 8A:
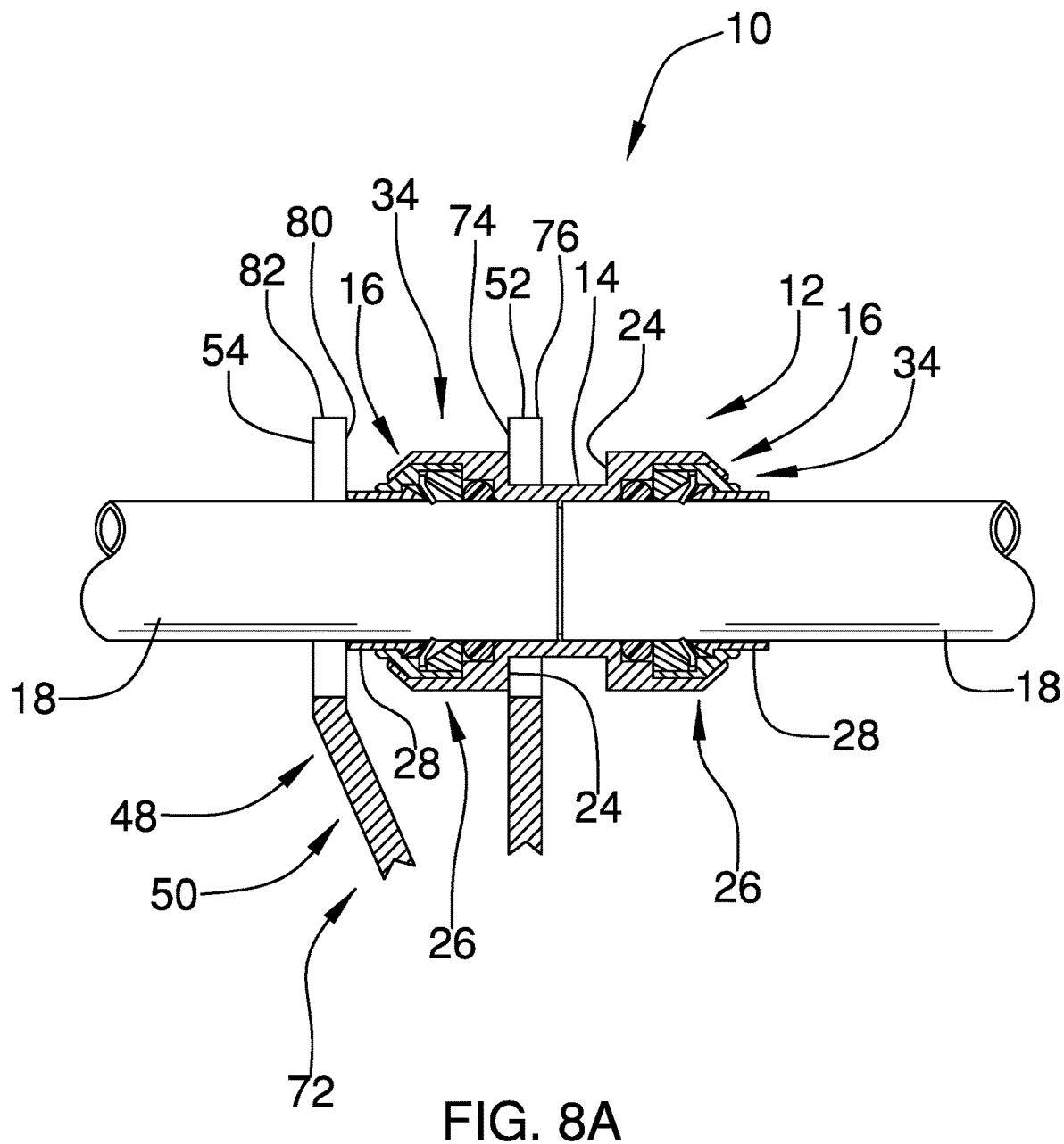
FIG. 8A is a cross-section in-use view of an embodiment of the disclosure taken from Arrows 8-8 in FIG. 5.
Figure 8B:
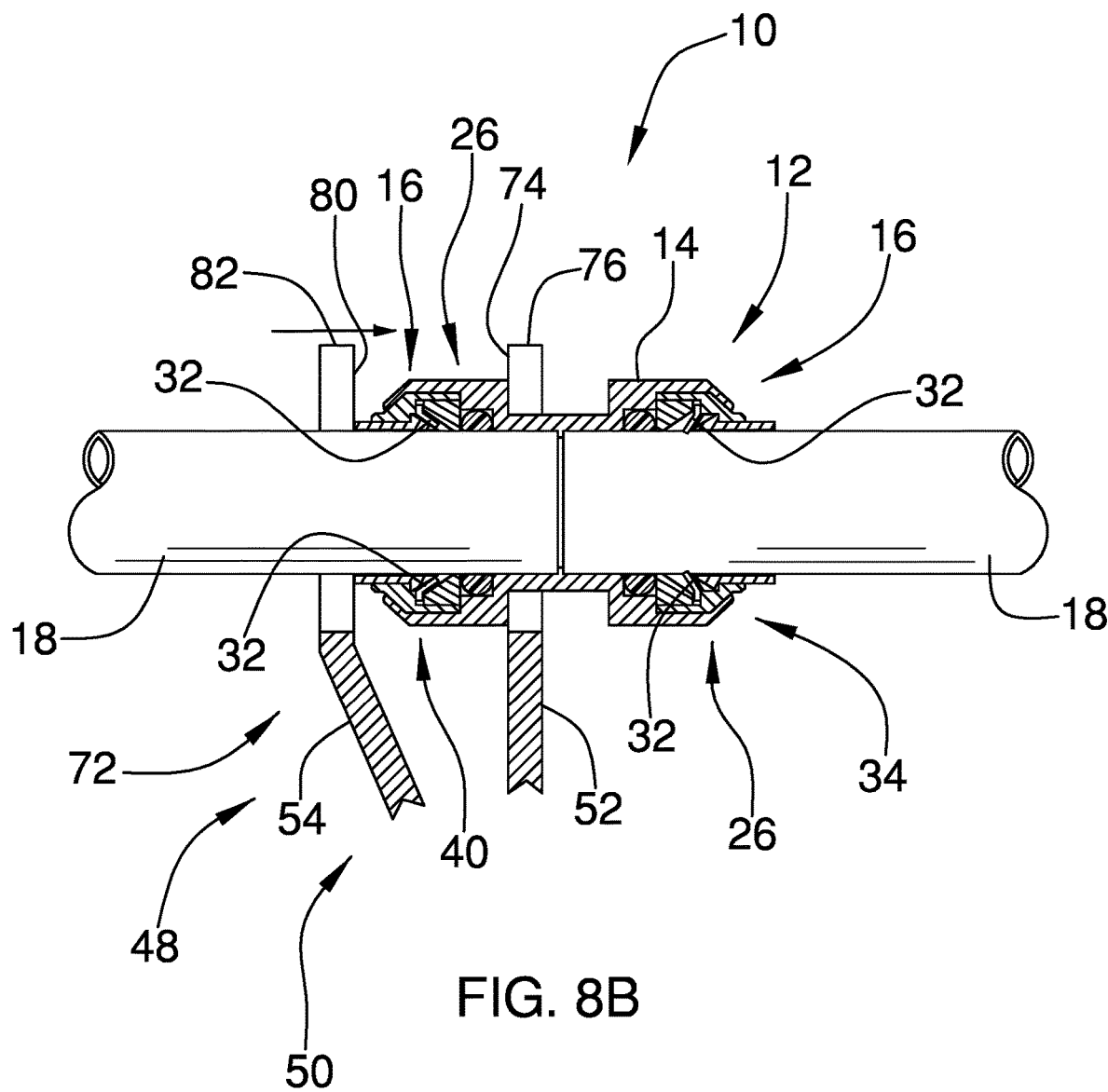
FIG. 8B is a cross-section in-use view of an embodiment of the disclosure taken from Arrows 8-8 in FIG. 5.
Figure 8C:
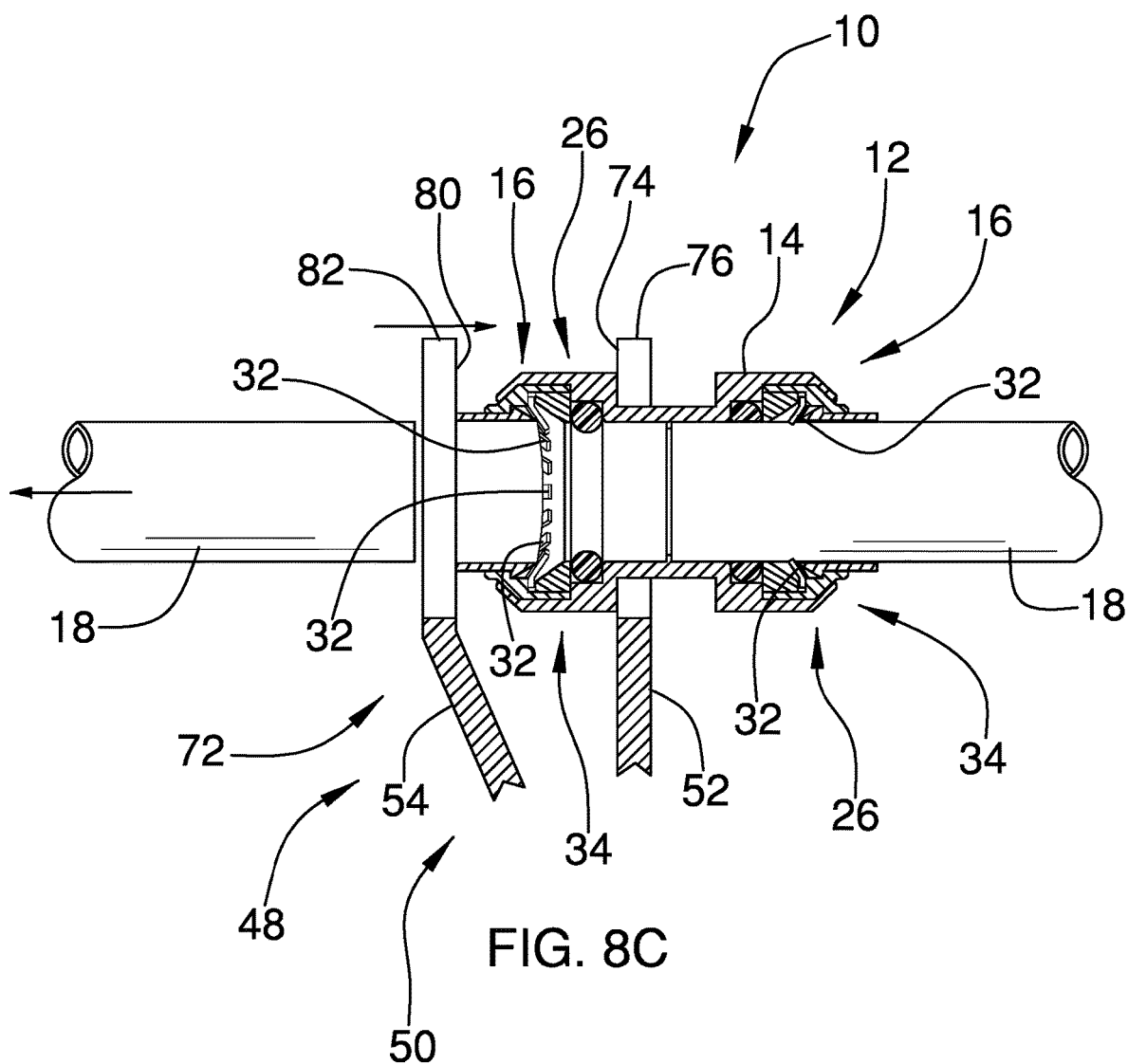
FIG. 8C is a cross-section in-use view of an embodiment of the disclosure taken from Arrows 8-8 in FIG. 5.

With reference now to the drawings, and in particular to FIGS. 1 through 8C thereof, a new pipe fitting removal tool embodying the principles and concepts of an embodiment of the disclosure and generally designated by the reference numeral 10 will be described.

As best illustrated in FIGS. 1 through 8C, the pipe disassembly system 10 generally comprises a pipe fitting 12 comprising a body 14 and a pair of retainers 16 for keeping a pipe 18 retained in the body 14. The body 14 has a channel 20 extending through the body 14 and a pair of openings 22 which each extend into the body 14 to the channel 20. The body 14 has a pair of shoulder surfaces 24, each of which extends radially inwardly with respect to the body 14. Each retainer 16 of the pair of retainers 16 is coupled to the body 14 and is positioned in the channel 20. Each retainer 16 of the pair of retainers 16 is associated with a respective opening 22 of the pair of openings 22.

Each retainer 16 comprises a retaining ring 26 and a release collar 28. The retaining ring 26 is coupled to an inner wall 30 of the body 14 and is positioned within the channel 20. The retaining ring 26 comprises a plurality of teeth 32 which is arranged radially with respect to the channel 20. Each tooth 32 of the retaining ring 26 is biased toward a retaining position 34 in which each tooth 32 extends radially inwardly with respect to the channel 20. Each tooth 32 of the retaining ring 26 is configured for engaging the pipe 18 when the pipe 18 inserted into the channel 20 through the respective opening 22 and the retaining ring 26 when each tooth 32 is positioned in the retaining position 34. The release collar 28 is slidably coupled to the body 14 and extends through the respective opening 22. The release collar 28 has an outward end 36 that is positioned outside of the channel 20 and an inward end 38 that is positioned within the channel 20. The inward end 38 is positioned in abutment with each tooth 32 of the retaining ring 26. The release collar 28 is movable axially inwardly of the channel 20 to move each tooth 32 of the retaining ring 26 radially outwardly with respect to the channel 20 to a release position 40. Each tooth 32 of the retaining ring 26 is disengaged from the pipe 18 inserted into the channel 20 through the respective opening 22 and the retaining ring 26 when each tooth 32 is positioned in the release position 40.

The pipe fitting 12 may also include an intermediary wall 42 which is positioned within the channel 20 between each opening 22 of the pair of openings 22. The intermediary wall 42 has an annular shape such that each opening 22 is in fluid communication with each other across the intermediary wall 42. The intermediary wall 42 also prevents the pipe 18 from extending entirely through the channel 20. The pipe fitting 12 may also have a pair of O-rings 46, each of which is positioned opposite the other across the intermediary wall 42 for sealingly engaging the pipe 18 when the pipe 18 is inserted into the pipe fitting 12.

A fitting removal tool 48 is provided for removing the pipe fitting 12 from the pipe 18. The fitting removal tool 48 comprises a locking pliers 50, a first engagement member 52, and a second engagement member 54. The locking pliers 50 includes a first handle 56, a first jaw 58, a second jaw 60, a toggle linkage 62, and a second handle 64. The first jaw 58 is coupled to and extends away from the first handle 56. A distal end 66 of the first jaw 58 with respect to the first handle 56 defines a front end 68 of the locking pliers 50. The second jaw 60 is pivotally coupled to the first handle 56 such that the second jaw 60 is movable toward and away from the first jaw 58. The second jaw 60 is movable from an open position 70 toward the first jaw 58 to a locking position 72. The toggle linkage 62 is coupled to the first handle 56 and the second jaw 60 for securing the second jaw 60 in the locking position 72. The second handle 64 is coupled to the toggle linkage 62 for toggling the toggle linkage 62.

The first engagement member 52 and the second engagement member 54 are provided for engaging the body 14 of the pipe 18 and the release collar 28 of a selected retainer 16 to release the pipe 18. The first engagement member 52 is coupled to and extends away from the first jaw 58. The first engagement member 52 has an engagement surface 74 which is positioned adjacent to a distal end 76 of the first engagement member 52 with respect to the first jaw 58. The first engagement member 52 also has a first engagement member recess 78 extending into the distal end 76 of the first engagement member 52. The first engagement member recess 78 is shaped to receive the body 14 of the pipe fitting 12. The engagement surface 74 of the first engagement member 52 is engageable with a selected one of the pair of shoulder surfaces 24 when the first engagement member recess 78 receives the body 14.

The second engagement member 54 is coupled to and extends away from the second jaw 60. The second engagement member 54 has an engagement surface 80 which is positioned adjacent to a distal end 82 of the second engagement member 54 with respect to the second jaw 60. The second engagement member 54 also has a second engagement member recess 84 extending into the distal end 82 of the second engagement member 54. The second engagement member recess 84 is shaped to be configured to receive the pipe 18. The engagement surface 80 of the second engagement member 54 is engageable with the release collar 28 of the selected retainer 16. The second engagement member recess 84 defines a concavely arcuate surface 86 in the second engagement member 54. The fitting removal tool 48 is positionable to engage the body 14 and the release collar 28 of the selected retainer 16 when the second jaw 60 is in the locking position 72 such that teeth 32 of the retaining ring 26 are positioned in the release position 40.

In one embodiment, a radius of the concavely arcuate surface 86 of the second engagement member 54 is between 0.2 inches and 0.4 inches. In another embodiment, the radius is between 0.4 inches and 0.6 inches. In yet another embodiment, the radius is between 0.6 inches and 1.0 inches.

In use, the engagement surface 74 of the first engagement member 52 engages the selected shoulder surface 24 of the body 14 of the pipe fitting 12. The second jaw 60 is secured in the locking position 72 with the engagement surface 80 of the second engagement member 54 engaging the release collar 28 of the selected retainer 16 to move each of the teeth 32 of the retaining ring 26 of the selected retainer 16 to the release position 40. The fitting removal tool 48 maintains the retainer 16 in this position so the pipe 18 can be removed from the fitting without interference from the teeth 32.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pipe disassembly system comprising:
    a pipe fitting comprising:
        a body having a channel extending into said body, said body having an opening, said opening extending into said body to said channel; and
        a retainer being coupled to said body and being positioned in said channel, said retainer comprising:
            a retaining ring being coupled to an inner wall of said body and being positioned within said channel, said retaining ring comprising a plurality of teeth being arranged radially with respect to said channel, each said tooth of said retaining ring being biased toward a retaining position wherein each said tooth extends radially inwardly with respect to said channel, each said tooth of said retaining ring being configured for engaging a pipe inserted into said channel through said opening and said retaining ring when each said tooth is positioned in said retaining position; and
            a release collar being slidably coupled to said body and extending through said opening, said release collar having an outward end being positioned outside of said channel and having an inward end being positioned within said channel, said inward end being positioned in abutment with each said tooth of said retaining ring, said release collar being movable axially inwardly of said channel to move each said tooth of said retaining ring radially outwardly with respect to said channel to a release position, each said tooth of said retaining ring being configured for being disengaged from the pipe inserted into said channel through said opening and said retaining ring when each said tooth is positioned in said release position; and
    a fitting removal tool comprising:
        a locking pliers comprising a first jaw and a second jaw, said second jaw being pivotally movable toward and away from said first jaw, said second jaw being movable from an open position toward said first jaw to a locking position, said second jaw being securable in said locking position;
        a first engagement member for engaging said body of said pipe fitting, said first engagement member being coupled to and extending away from said first jaw, an engagement surface of said first engagement member being planar and parallel to a planar surface of said first jaw;
        a second engagement member for engaging said release collar of said retainer of said pipe fitting, said second engagement member being coupled to and extending away from said second jaw, an engagement surface of said second engagement member having a distal portion extending from said second jaw at an obtuse angle relative to a coupled portion attached to said second jaw; and
        said fitting removal tool being positionable to engage said body and said release collar of said retainer when said second jaw is in said locking position such that said teeth of said retaining ring is positioned in said release position.

2. The system of claim 1, wherein said first engagement member has a first engagement member recess extending into said distal end of said first engagement member, said first engagement member recess being shaped to receive said body of said pipe fitting.

3. The system of claim 2, wherein said body has a shoulder surface extending radially inwardly with respect to said channel, said engagement surface of said first engagement member being positioned adjacent to a distal end of said first engagement member with respect to said first jaw, said engagement surface of said first engagement member being engageable with said shoulder surface when said first engagement member recess receives said body.

4. The system of claim 1, wherein said second engagement member has a second engagement member recess extending into said distal end of said second engagement member, said second engagement member recess being shaped to be configured to receive the pipe, said second engagement member recess defining a concavely arcuate surface in said second engagement member.

5. The system of claim 1, wherein said engagement surface of said second engagement member is positioned adjacent to a distal end of said second engagement member with respect to said second jaw, said engagement surface of said second engagement member being engageable with said release collar of said retainer.

6. The system of claim 4, wherein said concavely arcuate surface has a radius of between 0.2 inches and 0.4 inches.

7. The system of claim 4, wherein said concavely arcuate surface has a radius of between 0.4 inches and 0.6 inches.

8. The system of claim 4, wherein said concavely arcuate surface has a radius of between 0.6 inches and 1.0 inches.

9. The system of claim 1, wherein said locking pliers further comprises:
    a first handle, said first jaw being coupled to and extending away from said first handle, a distal end of said first jaw with respect to said first handle defining a front end of said locking pliers;
    a toggle linkage being coupled to said first handle and said second jaw for securing said second jaw in said locking position; and
    a second handle being coupled to said toggle linkage for toggling said toggle linkage.

10. The system of claim 1, wherein:
    said opening is one of a pair of openings, each said opening extending into said body to said channel;
    said retainer is one of a pair of retainers, each retainer of said pair of retainers being coupled to said body and being positioned in said channel, each retainer of said pair of retainers being associated with a respective opening of said pair of openings, each said retainer comprising:
  a retaining ring being coupled to an inner wall of said body and being positioned within said channel, said retaining ring comprising a plurality of teeth being arranged radially with respect to said channel, each said tooth of said retaining ring being biased toward a retaining position wherein each said tooth extends radially inwardly with respect to said channel, each said tooth of said retaining ring being configured for engaging a pipe inserted into said channel through said respective opening and said retaining ring when each said tooth is positioned in said retaining position; and
  a release collar being slidably coupled to said body and extending through said respective opening, said release collar having an outward end being positioned outside of said channel and having an inward end being positioned within said channel, said inward end being positioned in abutment with each said tooth of said retaining ring, said release collar being movable axially inwardly of said channel to move each said tooth of said retaining ring radially outwardly with respect to said channel to a release position, each said tooth of said retaining ring being configured for being disengaged from the pipe inserted into said channel through said respective opening and said retaining ring when each said tooth is positioned in said release position; and
said fitting removal tool is positionable to engage said body and said release collar of a selected retainer of said pair of retainers when said second jaw is in said locking position such that said teeth of said retaining ring of said selected retainer are positioned in said release position.

11. A pipe disassembly system comprising:
a pipe fitting comprising:
  a body having a channel extending through said body, said body having a pair of openings, each said opening extending into said body to said channel, said body having a pair of shoulder surfaces, each said shoulder surface extending radially inwardly with respect to said body; and
  a pair of retainers, each retainer of said pair of retainers being coupled to said body and being positioned in said channel, each retainer of said pair of retainers being associated with a respective opening of said pair of openings, each said retainer comprising:
    a retaining ring being coupled to an inner wall of said body and being positioned within said channel, said retaining ring comprising a plurality of teeth being arranged radially with respect to said channel, each said tooth of said retaining ring being biased toward a retaining position wherein each said tooth extends radially inwardly with respect to said channel, each said tooth of said retaining ring being configured for engaging a pipe inserted into said channel through said respective opening and said retaining ring when each said tooth is positioned in said retaining position; and
    a release collar being slidably coupled to said body and extending through said respective opening, said release collar having an outward end being positioned outside of said channel and having an inward end being positioned within said channel, said inward end being positioned in abutment with each said tooth of said retaining ring, said release collar being movable axially inwardly of said channel to move each said tooth of said retaining ring radially outwardly with respect to said channel to a release position, each said tooth of said retaining ring being configured for being disengaged from the pipe inserted into said channel through said respective opening and said retaining ring when each said tooth is positioned in said release position;
a fitting removal tool comprising:
  a locking pliers comprising:
    a first handle;
    a first jaw being coupled to and extending away from said first handle, a distal end of said first jaw with respect to said first handle defining a front end of said locking pliers;
    a second jaw being pivotally coupled to said first handle such that said second jaw is movable toward and away from said first jaw, said second jaw being movable from an open position toward said first jaw to a locking position;
    a toggle linkage being coupled to said first handle and said second jaw for securing said second jaw in said locking position; and
    a second handle being coupled to said toggle linkage for toggling said toggle linkage;
  a first engagement member for engaging said body of said pipe fitting, said first engagement member being coupled to and extending away from said first jaw, said first engagement member having an engagement surface being positioned adjacent to a distal end of said first engagement member with respect to said first jaw, said first engagement member having a first engagement member recess extending into said distal end of said first engagement member, said first engagement member recess being shaped to receive said body of said pipe fitting, said engagement surface of said first engagement member being engageable with a selected one of said pair of shoulder surfaces when said first engagement member recess receives said body, said engagement surface of said first engagement member being planar and parallel to a planar surface of said first jaw;
  a second engagement member for engaging said release collar of a selected one of said retainers of said pipe fitting, said second engagement member being coupled to and extending away from said second jaw, said second engagement member having an engagement surface being positioned adjacent to a distal end of said second engagement member with respect to said second jaw, said second engagement member having a second engagement member recess extending into said distal end of said second engagement member, said second engagement member recess being shaped to be configured to receive the pipe, said engagement surface of said second engagement member being engageable with said release collar of said selected retainer, said second engagement member recess defining a concavely arcuate surface in said second engagement member, said engagement surface of said second engagement member having a distal portion extending from said second jaw at an obtuse angle relative to a coupled portion attached to said second jaw; and
  said fitting removal tool being positionable to engage said body and said release collar of said selected retainer when said second jaw is in said locking position such that said teeth of said retaining ring of said selected retainer are positioned in said release position.

12. The system of claim 11, wherein said concavely arcuate surface has a radius of between 0.2 inches and 0.4 inches.

13. The system of claim 11, wherein said concavely arcuate surface has a radius of between 0.4 inches and 0.6 inches.

14. The system of claim 11, wherein said concavely arcuate surface has a radius of between 0.6 inches and 1.0 inches.

\* \* \* \* \*